United States Patent Office 3,320,224
Patented May 16, 1967

3,320,224
POLYMERIZATION CATALYST SYSTEM
AND PROCESS
William J. Raich, Midland, and Maurice R. Peacock, Wheeler, Mich., assignors to The Dow Chemical Company, Midland, Mich., a corporation of Delaware
No Drawing. Filed Jan. 27, 1964, Ser. No. 340,536
8 Claims. (Cl. 260—93.7)

This invention relates to a new and improved polymerization process and is particularly concerned with the use of a novel heterogeneous catalyst composition for preparing high molecular weight solid polyolefins, such as polypropylene, having a high isotactic content.

In the polymerization of propylene and other olefins, it has been found that with heterogeneous catalyst systems, such as complexes formed from $TiCl_4$ with aluminum alkyls, such as $AlEt_3$, etc., $TiCl_3$ plus $AlEt_3$, etc., there is a substantial portion of amorphous or atactic polymer formed. These atactic polymers have a random polymer structure whereas the desired isotactic type of polymer has a stereospecific type of structure in which the side branches from the linear chain are arranged in a regular repeating type of arrangement which gives desired crystallizable structure and resultant desired qualities in the polymer.

The isotactic polymer of propylene, is a hard, tough, high melting (165–175° C.) and highly crystalline material (65–75% by X-ray determination) which is insoluble in hot hexane.

In contrast, the atactic polymer may range from a grease-like to wax-like material depending upon its molecular weight, but regardless of molecular weight is soluble in hot hexane.

The amount of isotactic polymer contained in the total polymer product formed in any given polymerization appears to have a significant influence on certain properties of the polymer product, such as hardness, modulus, ultimate tensile strength, range of melting temperatures, and molding and fiber forming properties. The higher the isotactic content of the polymer, the more outstanding are the physical properties of that polymer.

A number of catalyst systems have been tried in an attempt to avoid or to reduce to a permissible amount the formation of such atactic polymers as byproducts in the production of the desired isotactic polymeric olefin. While certain catalyst systems give some small decrease in the amount of atactic byproduct, they produce side effects which are almost as disadvantageous, such as a decrease in the yield of polymer. Certain other catalyst systems actually increase the amount of atactic material. In other words, most polymerization catalyst systems either are noneffective in reducing the amount of such byproduct formed or where there is any improvement in this respect, certain other disadvantages result to offset such improvement.

It is an object of this invention, therefore, to provide an improved process for producing isotactic polymers.

Another object of the invention is to provide a process for preparing polymers having isotactic contents which are higher than those of conventionally prepared polymers.

A further object of the invention is to provide a process in which increased yields of isotactic polymers are obtained.

Other and further objects and advantages of the invention will become apparent to those skilled in the art upon consideration of the accompanying disclosure.

According to the present invention, olefin polymers of very high isotactic content can be prepared by conducting the polymerization in the presence of a catalyst mixture comprised of a trialkylaluminum, a halide of titanium, and a dialkylaluminum cyclopentadiene. By the use of this catalyst composition, the proportion of atactic polymer formed in the polymerization of propylene, butene-1, and other olefins which normally form substantial amounts of atactic polymer byproduct in heterogeneous catalyst systems, can be reduced without any disadvantageous side effects to an amount which is not harmful to the properties of the desired polymer. In addition, the catalyst composition is beneficial in increasing the yield of isotactic polymer over that otherwise experienced.

Any α-olefin can be polymerized according to the present invention. By the term α-olefin is meant any compound which can be represented by the formula

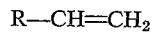

$$R-CH=CH_2$$

where R is hydrogen or an alkyl, cycloalkyl, or aryl group. Examples are ethylene, propylene, 1-n-butene, 3-methyl-1-butene, 1-n-pentene, 4-methyl-1-pentene, 1-n-hexene, and aromatic vinyl hydrocarbons such as for example styrene and its homologues. These olefins can be polymerized alone to form homopolymers, or as mixtures with each other to form valuable copolymers. Particularly useful results are obtained from the polymerization of aliphatic α-olefins such as for example, propylene.

The trialkylaluminum component of the catalyst mixture of the present invention can be represented by the general formula $R''_3Al$, wherein $R''$ is an alkyl radical, preferably containing from 1 to 12, inclusive, carbon atoms. Examples of compounds corresponding to the aforementioned formula which can be used include trimethylaluminum, triethylaluminum, triisobutylaluminum, tri-n-butylaluminum, tri-n-pentylaluminum, triisooctylaluminum, tri-n-dodecylaluminum, and the like.

The titanium halide component of the catalyst mixture of the present invention may be any of the titanium halides including the chloride, bromides, and iodides, the trichlorides of titanium being preferred.

A particularly suitable heterogeneous catalyst system of this invention is one using $TiCl_3$, preferably in the alpha form, and an aluminum trialkyl, such as aluminum triethyl. In such a catalyst system, it is found desirable to have an Al–Ti ratio of approximately 0.5–10 moles of aluminum compound per mole of Ti compound. A particularly suitable ratio is 2 moles of aluminum compound per mole of titanium compound. Other examples of such catalyst systems include triisobutylaluminum and titanium trichloride, tri-n-dodecylaluminum and titanium trichloride, titanium tribromide and tri-n-butylaluminum, titanium tribromide and triisooctylaluminum, titanium tetrachloride and triisobutylaluminum, titanium tetrabromide and tri-n-heptylaluminum, and titanium tetraiodide and triethylaluminum.

Typical examples of the dialkyl aluminum cyclopentadiene compounds include dimethyl, diethyl, dipropyl, dibutyl, diisobutyl, and dihexyl, aluminum cyclopentadiene.

The dialkyl aluminum cyclopentadienes are prepared by exchange reactions between dialkyl aluminum halides and metal cyclopentadienides such as sodium, or lithium cyclopentadienide or magnesium dicyclopentadienide.

The ratios of the catalyst components employed in the present process can be varied rather widely, depending upon the particular monomer used and the operating conditions. The mole ratio of the trialkylaluminum to the titanium halide is usually in the range of 0.5:1 to 10:1 with the preferred range being 1:1 to 4:1. The amount of dialkyl aluminum cyclopentadiene included in the catalyst mixture is generally in the range of 0.01 to 0.5 mole per mole of titanium halide, .02 to 0.1 mole being preferred.

The concentration of titanium halide catalyst in the polymerization zone is usually in the range of 0.1 to 0.5 weight percent, based on the inert polymerization vehicle charged to that zone.

The polymerization reaction is carried out with the components of the reaction dispersed throughout an inert liquid vehicle and, when the α-olefin to be polymerized is normally a gas, the latter can be bubbled through the liquid vehicle which contains the catalyst system. Examples of the preferred liquid vehicles are aliphatic, cycloaliphatic, and hydrogenated aromatic hydrocarbons, such as pentane, hexane, cyclohexane, heptane, tetrahydronaphthalene, decahydronaphthalene, the higher paraffins, and mixtures thereof. Aromatic hydrocarbons such as benzene, xylene, halogenated aromatic hydrocarbons, such as orthodichlorobenzene and chlorinated naphthalene and mixtures thereof may also be used.

Generally, the polymerization of this invention can be conducted in a rather broad temperature range, namely, from about room temperature to about 150° C., preferably in the range of 55°–75° C. However, improved effects of this catalyst system are observed at temperatures even below room temperature.

It is unnecessary to employ elevated pressures in order to bring about the polymerization of α-olefins according to the present invention. However, for convenience of handling normally gaseous olefins, such as ethylene and propylene, it is sometimes advantageous to employ slightly elevated pressures. Most suitably the present invention is carried out under a pressure between atmospheric and 500 pounds per square inch gauge (p.s.i.g.). For the polymerization of polypropylene, a pressure range of 10 p.s.i.g. to 100 p.s.i.g. is desirable.

The preparation of the catalyst system and the subsequent polymerization are preferably carried out in the absence of molecular oxygen, carbon monoxide, carbon dioxide, and water. Most suitably, all reactions are carried out in an atmosphere of the olefin being polymerized if this is a gas, or, if the olefin is a liquid, in an atmosphere of an inert gas such as nitrogen. The catalyst systems or their components are destroyed by reaction with oxygen, carbon monoxide, carbon dioxide, or water; and consequently, if any of these are present in excess, no polymerization will take place.

Polymerization according to the process of the present invention can be brought about by mixing the essential components of the catalyst system in a suitable inert liquid vehicle and then adding the α-olefin to the catalyst system so formed. The process may be carried out batchwise or continuously and by its use high yields of isotactic polymers can be produced. The residence time used in a continuous process can vary widely since it depends to a great extent upon the temperature at which the process is carried out and upon the specific olefin that is to be polymerized. However, the residence time in a continuous process generally falls within the range of one second to an hour or more. In a batch process, the time for the reaction can also vary widely, such as from 15 minutes up to 24 hours or more.

Upon completion of the polymerization reaction, any excess olefin is vented and the contents of the reactor are then treated by any suitable method to inactivate the catalyst and remove the catalyst residues. In one method, inactivation of the catalyst is accomplished by washing with an alcohol, water, or other suitable materials. The isotactic polymer is then separated from the diluent, e.g., by decantation, filtration, or other suitable method after which the polymer is dried.

The atactic polymer may be recovered from the filtrate by suitable evaporation techniques.

The practice of this invention is best illustrated by the following examples. The techniques and conditions normally used in heterogenous catalyst systems are suitable for the practice of this invention. These examples are given merely by way of illustration and are not intended to limit the scope of the invention in any way nor the manner in which the invention can be practiced. Throughout the specification, where reference is made to "polymers" and "polymerization," it is intended that these terms embrace "copolymers" and "copolymerization" unless otherwise indicated.

EXAMPLE I

As a test, not exemplary of the present invention, propylene was polymerized in the following manner.

To a stirred autoclave jacketed to control temperature which had been previously evacuated to prevent the catalyst from coming in contact with air was charged one liter of dry hexane, in which was dispersed a catalyst composition comprised of 2 millimoles of α-TiCl$_3$ and 4 millimoles of triethyl aluminum. The autoclave was then pressurized to one atmosphere total pressure with propylene gas and then heated to 75° C. The propylene pressure was raised to 50 p.s.i.g. and stirring and heating of the mixture was continued for 1.5 hours after which time the autoclave was cooled and vented to atmospheric pressure. The catalyst was decomposed by the addition of a small quantity of alcohol and the solid polymer isolated from the mixture by filtration. There was obtained after drying a 10 g. yield of polymer, 21% of which was soluble in the hexane filtrate, i.e., 21% of the polymer produced was of the atactic form.

EXAMPLE II

The procedure of Example I was repeated, with the exception that varying concentrations of diethylaluminum cyclopentadiene were dispersed in the hexane along with the other catalyst components. Table I below summarizes the results obtained with various concentrations of diethylaluminum cyclopentadiene, said results indicating that the presence of small amounts of diethylaluminum cyclopentadiene substantially reduces the formation of atactic polypropylene. It is also apparent that the presence of the diethylaluminum cyclopentadiene substantially increases the yield of polymer in relation to the amount of polymer produced in Example I where the catalyst is prepared only from triethylaluminum and α-TiCl$_3$.

TABLE I

| Millimoles of Diethylaluminum Cyclopentadiene | Yield grams Polymer | Percent Hexane-soluble (atactic) Polymer |
|---|---|---|
| 0.01 | 38.1 | 13.4 |
| 0.04 | 50.7 | 8.3 |
| 0.50 | 18.6 | 8.6 |

In place of diethylaluminum cyclopentadiene in the foregoing example, there can be used other dialkylaluminum cyclopentadienes with substantially the same results.

What is claimed is:

1. A process for the polymerization of propylene, which comprises effecting the polymerization in an inert hydrocarbon liquid and in the presence of a catalyst system consisting essentially of (a) a trialkylaluminum, (b) a titanium trichloride, and (c) a dialkylaluminum cyclopentadiene, the molar ratio of said dialkylaluminum cyclopentadiene compound to titanium trichloride being within the range of 0.01:1 to 0.5:1.

2. The process of claim 1 wherein the dialkylaluminum cyclopentadiene compound is diethylaluminum cyclopentadiene.

3. The process of claim 1 wherein the polymerization is effected at a temperature in the range of about 20° to about 150° C. and a pressure of from normal atmospheric to 500 p.s.i.g.

4. The process of claim 1 wherein the trialkyl aluminum component of the catalyst system is triethyl aluminum.

5. A process for the polymerization of propylene, which comprises effecting the polymerization in an inert hydrocarbon liquid at a temperature range of about 55° to about 75° C., a pressure from about 10 p.s.i.g. to about 100 p.s.i.g., and in the presence of a catalytic mixture consisting essentially of (a) a triethylaluminum, (b) a titanium trichloride, and (c) a diethylaluminum cyclopentadiene, the molar ratio of said dialkylaluminum cyclopentadiene compound to titanium trichloride being within the range of 0.0:1 to 0.5:1.

6. As a composition of matter, a polymerization catalyst consisting essentially of (a) a trialkylaluminum, (b) a titanium trichloride and (c) a dialkylaluminum cyclopentadiene the molar ratio of dialkylaluminum cyclopentadiene to titanium trichloride being within the range of 0.0:1 to 0.5:1.

7. The composition of claim 6 wherein the trialkyl aluminum compound is triethylaluminum.

8. The composition of claim 6, wherein the dialkyl aluminum cyclopentadiene compound is diethylaluminum cyclopentadiene.

No references cited.

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,320,224                      May 16, 1967

William J. Raich et al.

It is hereby certified that error appears in the above numbered patent requiring correction and that the said Letters Patent should read as corrected below.

Column 5, line 8, and column 6, line 2, for "0.0:1", each occurrence, read -- 0.01:1 --.

Signed and sealed this 2nd day of January 1968.

(SEAL)
Attest:

Edward M. Fletcher, Jr.

Attesting Officer

EDWARD J. BRENNER

Commissioner of Patents